UNITED STATES PATENT OFFICE.

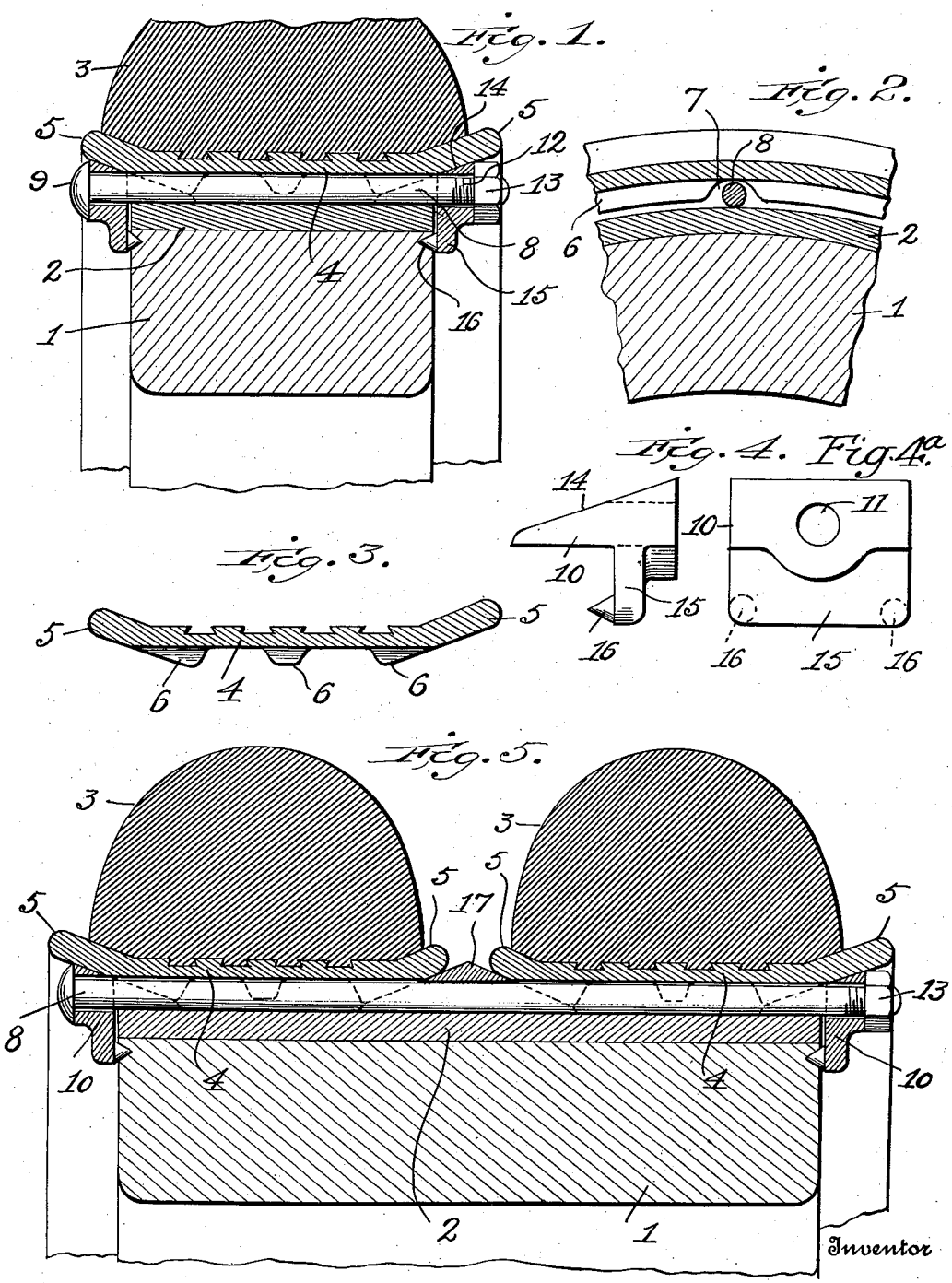

THOMAS MIDGLEY, OF DETROIT, MICHIGAN, ASSIGNOR TO MORGAN & WRIGHT, OF DETROIT, MICHIGAN, A CORPORATION OF MICHIGAN.

DEMOUNTABLE RIM FOR VEHICLE-TIRES.

1,162,379.   Specification of Letters Patent.   Patented Nov. 30, 1915.

Application filed June 18, 1913. Serial No. 774,356.

*To all whom it may concern:*

Be it known that I, THOMAS MIDGLEY, a citizen of the United States, residing at Detroit, in the county of Wayne, State of Michigan, have invented certain new and useful Improvements in Demountable Rims for Vehicle-Tires; and I do hereby declare the following to be a full, clear, and exact description of the invention, such as will enable others skilled in the art to which it pertains to make and use the same.

My invention relates to demountable rims for vehicle wheels, and has relation particularly to improved means for detachably mounting a tire bearing rim on the vehicle wheel in such manner that the same will be firmly locked in position and without the necessity for weakening the wooden felly by aperturing the same to receive the fastening means.

The invention contemplates the provision of a continuous rim or band to which the resilient tire is fixed, said rim and tire being detachably retained upon the usual felly band by means of a series of rods or bolts disposed transversely between said tire rim and felly band and carrying wedging members that not only lock the tire rim and its tire in position against displacement transversely, but also lock said tire rim and tire against any creeping movement longitudinally of the felly band.

In the accompanying drawing: Figure 1 is a transverse sectional view of a vehicle wheel showing a tire and my improved tire rim thereon, as well as the means for locking the same in position. Fig. 2 is a fragmentary longitudinal sectional view of the same. Fig. 3 is a detail transverse sectional view of my improved tire rim. Figs. 4 and 4ª embrace a side elevation and an end view respectively of one of my improved locking blocks. Fig. 5 is a view similar to Fig. 1 showing my improvement applied to a dual tire.

Similar numerals of reference denote corresponding parts in the several views.

In the said drawing the reference numeral 1 denotes the wooden felly of an ordinary automobile or other vehicle wheel, to which is fixed a metal felly band 2. The resilient tire 3, in this case a solid tire, is shown molded upon the tire rim 4, the latter being shaped suitably upon its outer surface to retain said tire in fixed relation, as shown, and being slightly angled or inclined at its edges 5 better to retain the tire against lateral displacement, and also to retain said rim in position, as will be hereinafter more particularly described. Said tire rim 4 is provided on its inner surface with a series of longitudinally disposed parallel ribs or fins 6, the same being interrupted at spaced intervals at 7 to permit the passage transversely thereof of bolts 8, the spaces left by providing said interrupted portions 7 being sufficient to receive said bolts freely between the band 2 and rim 4, as clearly shown in Figs. 1 and 2.

In assembling the parts the rim 4 carrying its tire 3 is slipped sidewise in position onto the felly rim 2, and the bolts 8, one for each space 7, and which are headed at one end at 9, are passed transversely through the spaces 7, each of said bolts before being inserted having had slipped thereon one of the locking blocks 10, shown in detail in Fig. 4. Said blocks are apertured at 11 to pass freely onto said bolts and assume a position in contact with the head 9 thereof. A similar locking block 10 is then slipped onto the free threaded end 12 of each of said bolts, and a nut 13 secured to position thereon. The said locking blocks 10, which are preferably of steel, are each formed with an outer wedging face 14 corresponding in angle with the angle of the edges 5 of the tire rim 4, and have a depending lug 15 provided on one face with one or more, preferably two, spurs 16, the lug 15 extending far enough to cause said spurs to register with the wooden felly 1, into which they are forced when the nut 13 is screwed to position. From this construction it will be seen that the inclined or wedging faces 14 of the blocks 10 by their engagement with the inclined inner faces of the edges 5 of the tire rim 4 will lock said tire rim firmly in position against displacement, while the engagement of the spurs 16 with the wooden felly effectually will prevent any creeping longitudinally of the tire rim 4 and its tire 3 on the felly band 2.

It will be understood that the longitudinal ribs or fins 6 on the inner face of the tire rim 4 will afford the necessary firm support for the tire rim 4 and its tire 3.

In Fig. 5 I have shown my improved construction applied to a dual tire construction, the only additional element required being a series of intermediate double faced wedging blocks 17, the same being interposed between the two parallel tire rims 4, there being one for each bolt 8, said intermediate blocks being preferably of a length corresponding to that of the blocks 10 and being recessed on their inner sides to permit the passage therethrough of the bolts 8, as shown.

In Fig. 1 I have shown the right hand edge 5 of the tire rim 4 slightly wider than the left hand edge, which is for the purpose of better protecting the nuts 13 from blows, said nuts being disposed on the outside of the wheel. And in the dual tire construction shown in Fig. 5, inasmuch as the same rims 4 are used as are shown in Fig. 1, this wider edge 5 of the innermost of the rims 4 is disposed to overlie the headed ends 9 of the bolts 8.
While I have shown a solid tire 3 mounted on the rim 4, it will be understood that I do not confine myself to such construction, as my improved locking mechanism is equally well adapted for use with a tire of any type, whether solid, cushion or pneumatic, the configuration of the outer face of the tire rim 4 being capable of variation to suit any type of tire.

Having thus described my invention, what I claim as new and desire to secure by Letters Patent is:

1. The combination with a vehicle wheel felly, of a tire rim and tire removably mounted thereon, said tire rim being recessed transversely at intervals on its underside, bolts removably disposed transversely in said recesses, a plurality of independent locking blocks carried by said bolts having inclined wedging faces engaging similar faces on said tire rim for retaining the latter in position, and means anchoring the blocks to the felly.

2. The combination with a vehicle wheel felly, of a tire rim and tire removably mounted thereon, said tire rim being recessed transversely at intervals on its underside, bolts removably disposed transversely in said recesses, and locking blocks carried by said bolts having inclined wedging faces engaging similar faces on said tire rim for retaining the latter in position, and having spurs engaging the felly to prevent longitudinal movement of said tire rim.

3. The combination with a vehicle wheel felly, of a tire rim and tire removably mounted thereon, said tire rim having longitudinally disposed fins or ribs on its inner side interrupted at spaced intervals to provide transverse recesses, bolts removably disposed transversely in said recesses, and locking blocks carried by said bolts having inclined wedging faces engaging similar faces on said tire rim for retaining the latter in position, and having spurs engaging the felly to prevent longitudinal movement of said tire rim.

In testimony whereof I have hereunto set my hand in the presence of two subscribing witnesses.

THOMAS MIDGLEY.

Witnesses:
JOHN CARLSON,
E. LA BUSCHEWSKY.